Nov. 7, 1961 P. L. PECCHENINO 3,007,398

PRINTING SYSTEM

Filed Dec. 30, 1957 5 Sheets-Sheet 1

INVENTOR.
PAUL L. PECCHENINO

BY John B. Aposnler

AGENT

Nov. 7, 1961 P. L. PECCHENINO 3,007,398

PRINTING SYSTEM

Filed Dec. 30, 1957 5 Sheets-Sheet 3

| | | | | | | | | | | | | | |
|---|---|---|---|---|---|---|---|---|---|---|---|---|---|
| | 8 | 8 | 8 | 8 | 8 | 4 | 4 | 4 | 4 | 2 | 2 | 1 | |
| | 4 | 2 | 2 | 1 | | 2 | 2 | 1 | | 1 | | | |
| | | 1 | | | | 1 | | | | | | | |
| | @ | # | | 9 | 8 | 7 | 6 | 5 | 4 | 3 | 2 | 1 | * |
| Y | * | $ | | R | Q | P | O | N | M | L | K | J | — |
| Z | ◊ | • | | I | H | G | F | E | D | C | B | A | & |
| Y&Z | % | , | | ~~Z~~ | Y | X | W | V | U | T | S | / | 0 |

United States Patent Office 3,007,398

Patented Nov. 7, 1961

3,007,398

PRINTING SYSTEM

Paul L. Pecchenino, Santa Clara County, Calif., assignor to International Business Machines Corporation, New York, N.Y., a corporation of New York Filed Dec. 30, 1957, Ser. No. 706,085

6 Claims. (Cl. 101—93)

This invention pertains to a type bar printer system and more particularly to such a system capable of high speed asynchronous operation.

In type bar printers of the prior art, and particularly in the so-called "parallel" printers wherein a plurality of type bars are raised simultaneously to their appropriate print positions, a rather substantial driving force has been required to accelerate and decelerate the large mass (120 type bars and associated apparatus) which necessarily must be moved. One such printer, for example, raises all type bars at once using a continuously rotating cam to transmit the driving force to a print bar setup mechanism which carries the bars upward. The print bar setup mechanism moves upwardly in a plurality of successive discrete binary coded increments at the same time it is carrying all the type bars with it. Due to the high inertias involved in such apparatus the cam referred to is not readily asynchronously clutchable to the driving means and therefore such printers are normally restricted to cyclic operation wherein the type bar setup mechanism is synchronized with and continuously operated by the driving means (via the cam). This limitation introduces a delay between the time the printer is told to print and commencement of the actual printing cycle, for the reason that the type bar setup mechanism is constantly traversing its cyclic path while the print cycle can only begin at one point along that path and therefore must await the arrival of that particular point. This point usually occurs just after all the type bars have been reset to their starting position.

At ordinary printing speeds such a time delay may not be objectionable. However, where high speed type bar printing is demanded, for example, on the order of three hundred lines per minute such as ordinarily found in computer output applications, any small delay in starting the print cycle imposes a significant printing speed handicap.

Accordingly, it is an object of this invention to provide a printing system wherein the printing cycle is asynchronous to the driving means so as to minimize time delays between receipt of an instruction to print and actual commencement of printing.

In the prior art referred to above, the force required to provide the binary coded upward movements of the type bar setup mechanism must be actually transmitted from the driving means to the setup mechanism by the cam employed. However, in the present invention the driving means need only drive a plurality of simple cams that control a hydraulic piston and cylinder arrangement which, in turn, provides the upward binary coded motion to the setup mechanism. Since the driving means need only operate a very low mass (i.e., the cams controlling the hydraulic arrangement) the driving means may be easily asynchronously coupled and decoupled to the setup mechanism.

It is another object of this invention, therefore, to provide a printing system wherein a relatively lightweight, high speed clutch controls a high driving force coupled to a print bar setup mechanism.

The cam of the prior art type bar printer, as referred to above, controls both deceleration and acceleration of the print bar setup mechanism. Therefore, it has been made in the form of a groove cooperating with an associated cam follower secured to the setup mechanism.

With this arrangement, any desired change in the sequence of binary coded steps necessarily requires the substitution of a new cam. However, the sequence of binary coded rises in the subject novel system may be altered merely by changing the angular disposition of selected cams.

Therefore, it is another object of this invention to provide a printing system wherein variations in the sequence of binary coded rises may be easily facilitated.

Another feature of this invention is that during the portion of the printing cycle allotted to resetting the ype bars, the print bar setup mechanism can be decoupled from the driving means without interrupting resetting of the type bars. This feature is useful in many applications since it provides a convenient time during the cycle for incorporating instructions for succeeding cycles. For example, in some accounting procedures where the printing format may be required to be changed between printing cycles, the desired change in format must necessarily be established prior to commencing the print cycle. In the event that the format change remains undetermined at the time the printer has entered the reset phase of its print cycle, the controlling cam shaft can be arrested at that point without interfering with the resetting of the type bars. This feature allows the operating personnel to view the last printed line even though the flow of printing may have been temporarily suspended pending establishment of a change in format.

Therefore, it is another object of this invention to provide a printer wherein resetting of the print bars is independent of continued coupling of driving means to setup mechanism after initiation of the reset phase of the print cycle.

Since the present invention provides asynchronous operation of type bar printers where it was not previously feasible before, another feature of this invention is that the printer is not continuously operated by the driving means. This feature, therefore, reduces wear and maintenance problems by permitting the printer to idle at all times when not actually printing. Noise is also reduced for the same reason.

Other objects of the invention will be pointed out in the following description and claims and illustrated in the accompanying drawings which disclose by way of example, the principle of the invention and the best mode which has been contemplated of applying that principle.

In the drawings:

FIG. 1 is a schematic diagram of this invention.

FIGS. 2*a*–2*c* schematically show the operation of the differential type bar positioning mechanism used in the invention.

*General arrangement*

Figure 1:
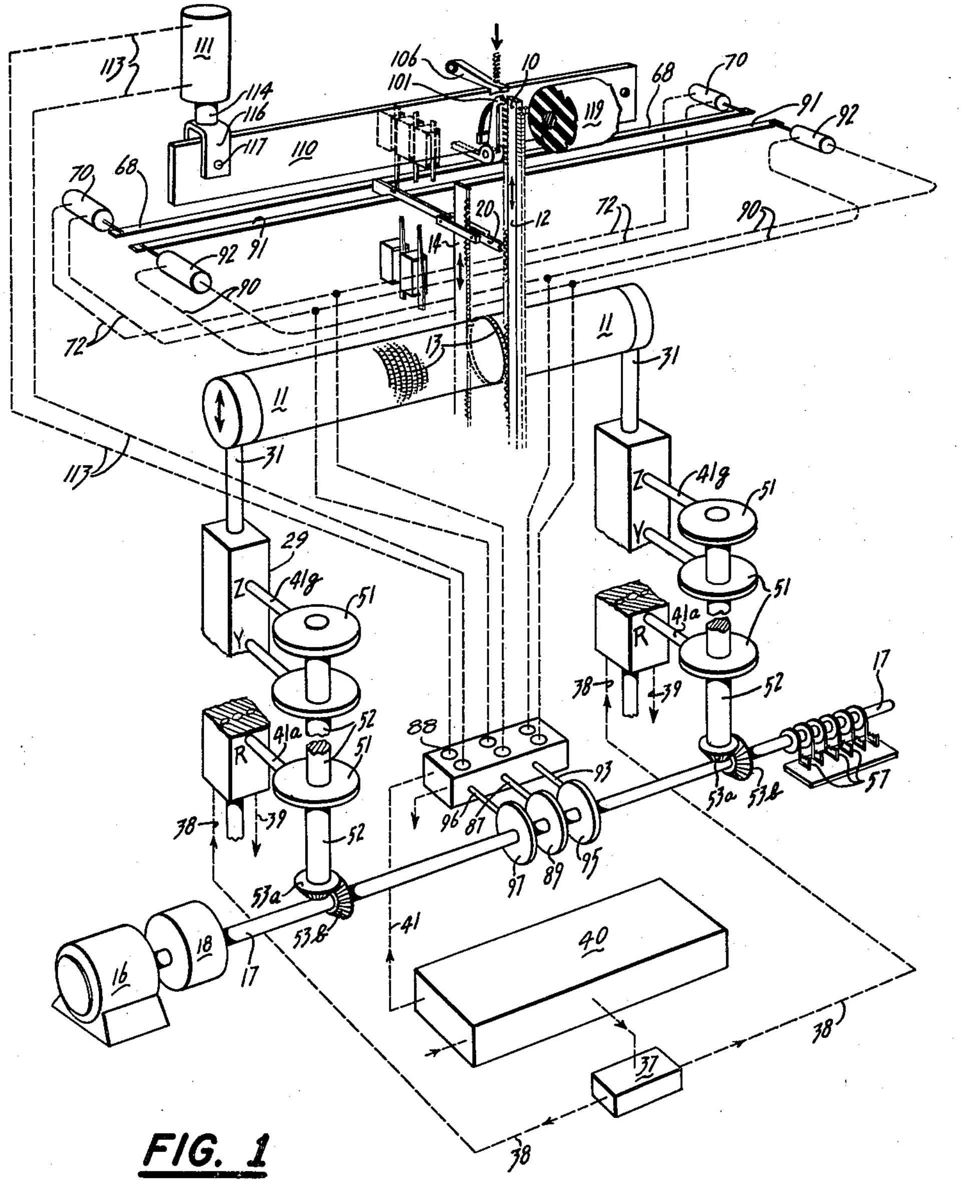

Referring to FIG. 1, a novel asynchronous printing system is there represented schematically comprising hydraulic actuating means for driving a type bar positioning mechanism. A clutch, preferably an asynchronous clutch such as a spring, friction disc, cone or electrostatic clutch couples a small motor to a cam shaft to control the hydraulic actuating means. Cams on the cam shaft also control hydraulically actuated bails for positioning the type bars and the cocking and firing of print hammers. The foregoing system components will be explained in detail below.

The term "asynchronous clutch" as used herein refers to that type of common clutch as used, for example, in many automobiles, wherein coupling may be effected without waiting for cooperating parts to match up or be placed in register with each other (i.e. "synchronized") as would be true, for example, in the square jaw positive clutch shown in FIGURE 2 on page 128 of the August 1952 issue of Machine Design. The best known example perhaps of an "asynchronous" clutch is the common friction disc clutch, such as described on pages 139–141 on the above publication. Therefore, since no "matching up" time is required in the asynchronous type of clutch, it is usually faster acting. However, nearly any clutch would operate satisfactorily within my novel system, whether the clutch is asynchronous or not, the faster acting asynchronous style of clutch merely being preferred only insofar as it further contributes to a high speed of operation.

*Type bar setup mechanism*

The type bar positioning mechanisms, only one of which is represented in the schematic arrangement of FIG. 1, are of a type which may be described as a binary actuated type bar setup mechanism in which a differential type bar moving mechanism is caused to go through cyclic operations involving dwells and rises of a driving member of the differential mechanism in such a way that the presence or absence of a binary signal during a dwell will cause one of two driven members of the differential to be locked during a following rise operation of the cycle, thereby selectively imparting motion to the type bar during that rise operation so that a predetermined type slug is finally moved to a printing position in accordance with binary signals during the well operations of each cycle.

Figure 2C:
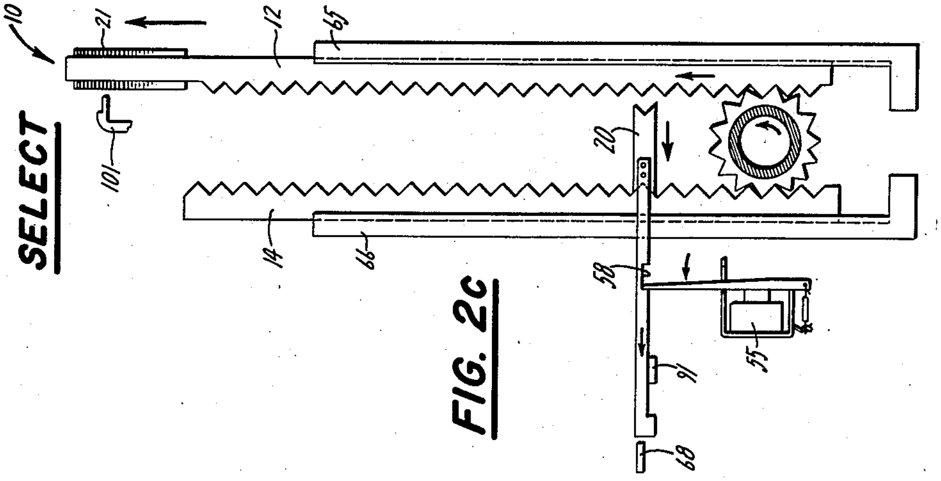
Figure 2B:
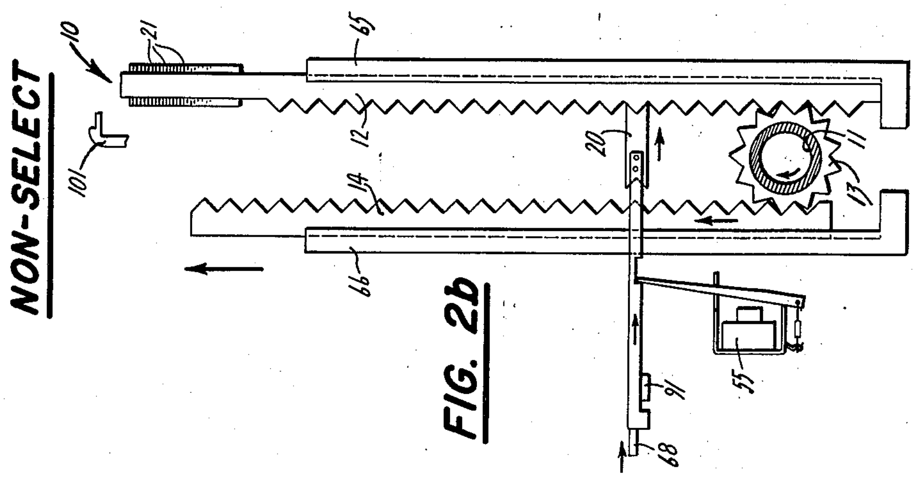
Figure 2A:
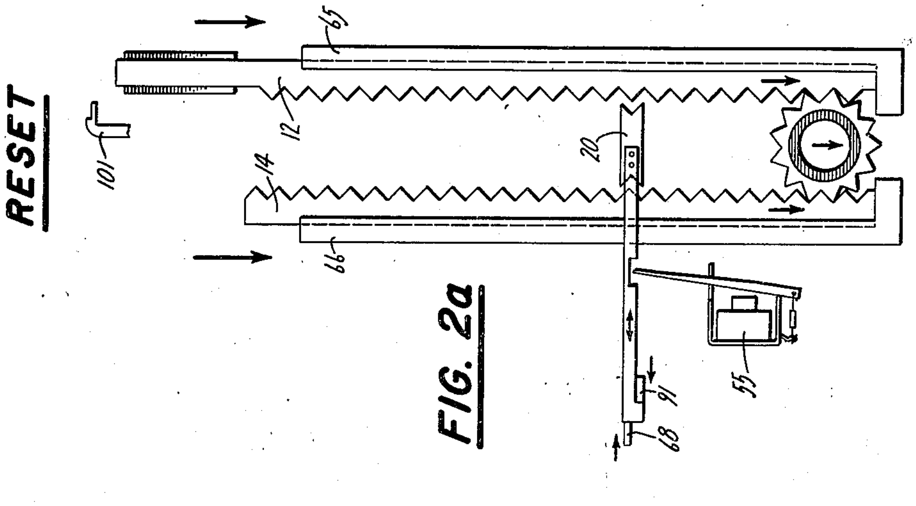

More specifically, one print station is diagrammatically illustrated in FIGS. 2*a*, 2*b* and 2*c*, in which a pinion 13, a rack 14 and a rack 12 integral with a type bar 10 have been represented. A pinion support tube 11 and an interposer 20 are shown between racks 14 and 12 so as to be movable to the position of locking either rack 12 or rack 14 in position or, thirdly, to be placed in a neutral position wherein neither rack is locked in position. In FIGS. 2*a*, 2*b* and 2*c* the interposer 20 is arranged to engage or to disengage either rack 12 or 14 during, and only during, a dwell phase of the cycle. When the interposer 20 is in engagement with rack 12 of type bar 10, type bar 10 is locked in position, which is hereinafter termed "the non-select condition." In the non-select condition, upward movement of tube 11 causes pinion 13 to be rotated via the interaction between pinion 13 and arrested rack 12, therein imparting upward motion to rack 14.

When interposer 20 is moved into engagement with rack 14, hereinafter termed "the select condition," the type bar of which rack 12 is a part is free to move (FIG. 2*c*) and rack 14 is locked into position. In this arrangement, therefore, a rise of tube 11 will cause pinion 13 to be rotated via interaction with rack 14, therein causing rack 12 and its associated type bar to be moved upwardly therewith.

During the downward stroke, interposer 20 is placed in the neutral position (FIG. 2*a*) wherein it is disengaged from both racks 14 and 12. This is called "the reset condition." During the reset condition tube 11 is lowered to the starting position. As both racks 14 and 12 are now free to move, pinion 13 forces both racks downwardly with equal force until one or the other meets a bottom stop, at which time pinion 13 forces the remaining rack downwardly to its bottom position. As will be hereinafter completely described, the movement of interposer 20 to either the select or non-select condition during the dwell preceding each rise will cause discrete positioning of the type bar in order that a predetermined spring-loaded type slug 21 will be in position with an associated type hammer 101.

Figures 3, 5:
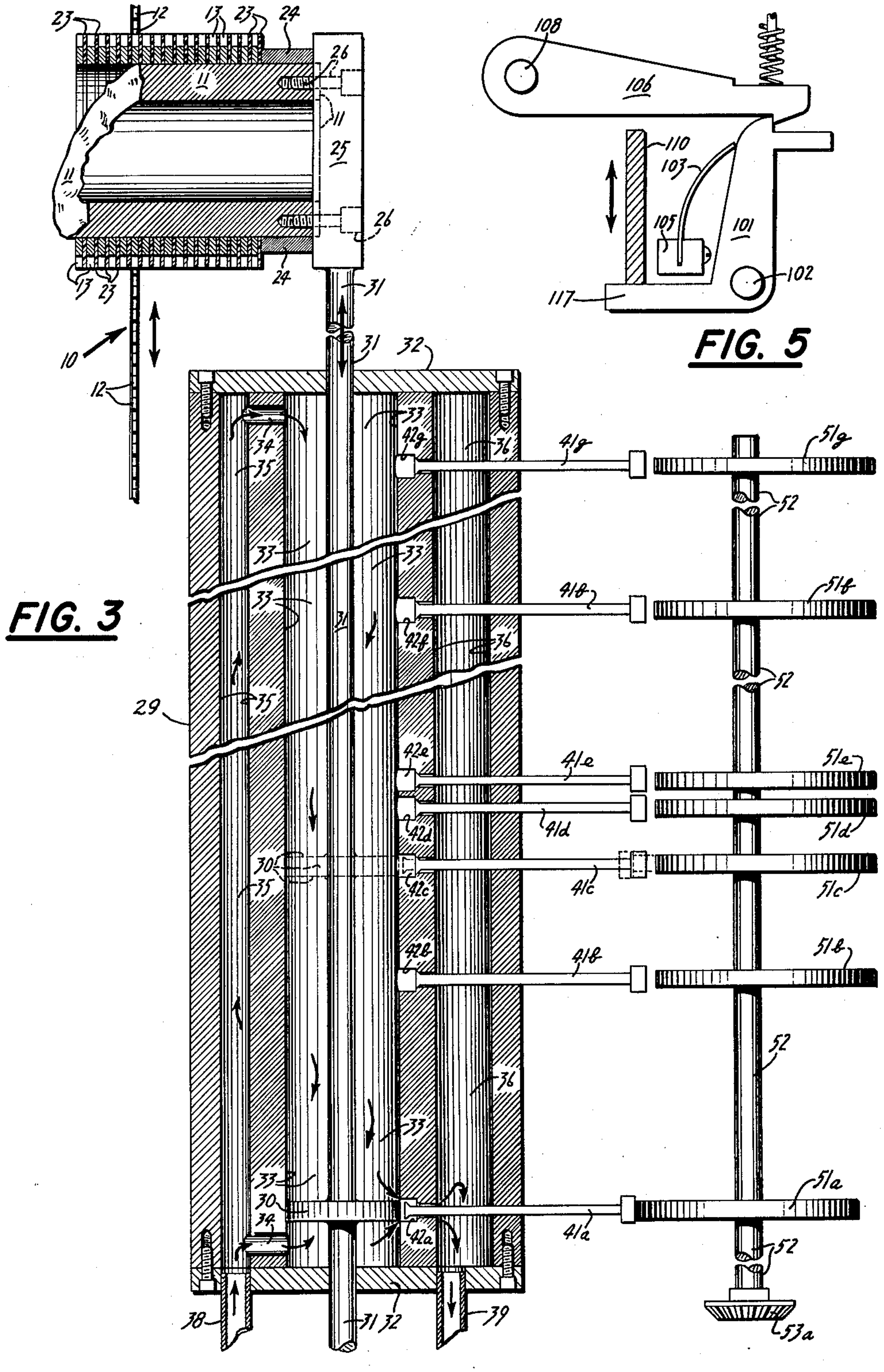
FIG. 3 is an elevation cross-section view of a hydraulic means for cyclically driving the differential type bar positioning mechanism.
FIG. 5 shows a means for operating a print hammer.

The upper portion of FIG. 3 shows in detail the structure of one end of tube 11 as represented in FIGS. 1 and 2*a* through 2*c*. The other end of tube 11 is identical with the end shown in FIG. 3 and therefore not illustrated. The structure comprises a cylindrical tube 11, the periphery of which is uniform and fitted with 120 pinions 13 provided to rotate freely therearound. Pinions 13 are held in spaced apart relationship by interpinion spacers 23. Tube 11 is fitted on each end with a primary spacer 24 held on tube 11 at each end by a block 25 which is integral with a hydraulic actuating rod 31. Blocks 25 are attached to each end of tube 11 so as to maintain pinions 13 in alignment with coacting racks 12 and 14.

*Hydraulic actuator*

A hydraulic actuating means (FIGS. 1 and 3) is arranged to cause tube 11 to rise upwardly in six steps interrupted by dwells and terminated by a longer dwell. The terminating dwell is then followed by a single fall to bring tube 11 to a bottom or starting dwell. This cycle is repeated for each revolution of a control cam shaft 17 (FIG. 1). Shaft 17 is driven by a small motor 16 acting through a lightweight asynchronous spring clutch 18.

One hydraulic arrangement, referred to as "port sensing" piston, for effecting the foregoing six-step cycle is located at each end (FIG. 1) of tube 11, one of which is shown in detail in the lower portion of FIG. 3. It comprises a cylinder 29, a piston 30 mounted within cylinder 29 on a piston rod 31, piston 30 and rod 31 being free to move together longitudinally of cylinder 29. Cylinder 29 is closed at each end by end plates 32 bolted thereto. A pair of conduits 35 and 36 have been formed longitudinally of cylinder 29 in the sidewalls thereof. Conduit 35 connects via a tube 38 and a flow divider 37 to the discharge side of a hydraulic pump 40 (see FIG. 1). Conduit 35 communicates with the bore 33 of cylinder 29 at each extremity thereof via openings 34, in order to supply fluid under pressure to opposite sides of piston 30. To exhaust fluid from bore 33, conduit 36 is connected by a tube 39 to the low pressure or sump side of pump 40.

A plurality of poppet valves 41 are disposed along one side of cylinder 29 in spaced apart relation according to binary coded increments. Thus, valve **41*b* is separated from valve 41*a* by a distance equivalent to eight units. Valve 41*c* is spaced from valve 41*b* by four units. Valve 41*d* is spaced from 41*c* by two units; 41*e* from 41*d* by one unit; 41*f* from 41*e* by thirteen units; and finally, 41*g* from 41*f* by twenty-six units. Therefore, valve 41*g* is separated from valve 41a by a total of fifty-four units. Each valve 41 controls a port 42 which leads from bore 33 to conduit 36**.

By applying equal pressures, and hence equal forces, to the two end faces of piston 30 the opening of one of valves 41 will cause a pressure drop on one side of piston 30. This pressure drop causes it to move in the direction of the opened port 42, i.e., piston 30 "senses" the low pressure port thus opened until it arrives thereat. With piston 30 located adjacent the opened port, the pressure differential previously created is cancelled. The thickness of piston 30 is slightly less than the width of port 42. This narrowing of piston 30 with respect to port 42 will substantially cause piston 30 to center itself at any opened port.

Each valve 41 cooperates with one of a series of actuator cams 51 disposed on a camshaft 52 arranged parallel with the axis of cylinder 29. Shafts 52 are each provided with a bevel gear **53*a* which engages a mate 53*b* on shaft 17. Cams 51 are arranged such that, starting with valve 41*b*, ports 42 are first opened, held open for a short dwell time, and then closed sequentially. In operation, as pump 40** supplies fluid under pressure to bore 33 via tube 38, conduit 35 and openings 34, rotation of shaft 52 will cause cam 51*b* to actuate valve 41*b* driving piston 30 eight units to a location adjacent port 52*b*. As shaft 52 continues to turn, port 42*b* is closed and 42*c* opened, thereby advancing piston 30 and rod 31 four additional units. The cycle thus commenced continues until all valves have been actuated. With the closing of port 42*g*, valve 41*a* is actuated opening port 42*a*. Valve 41*a* may be referred to as the "reset" valve, since when it opens port 42*a*, rod 31 is driven downwardly to its initial or starting position.

Another suitable hydraulic arrangement for performing the above function which may be referred to as a "piston adder" is taught by U.S. Letters Patent 2,197,867.

Tube 11, being connected to rod 31, therefore, starts in its lowest position, rises a discrete step, pauses, rises another step and pauses etc., for a total of six steps, pauses a somewhat longer period during which time printing occurs, and then falls to the starting position. The length of movement for each of the first four steps is one half the distance of the preceding step. The unit of movement for the first step, therefore, is eight, for the second step is four, for the third step is two, and for the fourth step is one. The unit of movement of the fifth step is thirteen, and of the sixth step is twenty-six, producing a total of fifty-four individual units of movement.

It will be noted in FIG. 1 that the stems of valves 41 are shown as being normal to the axis of tube 11, whereas in FIG. 3 tube 11 has been rotated 90° to make the valve stems appear parallel thereto. This apparent discrepancy between FIGS. 1 and 3 has been employed for purposes of showing the structure of tube 11 as well as its relationship to rod 31 of the hydraulic actuating means just described.

*Selection mechanism*

Figure 4:
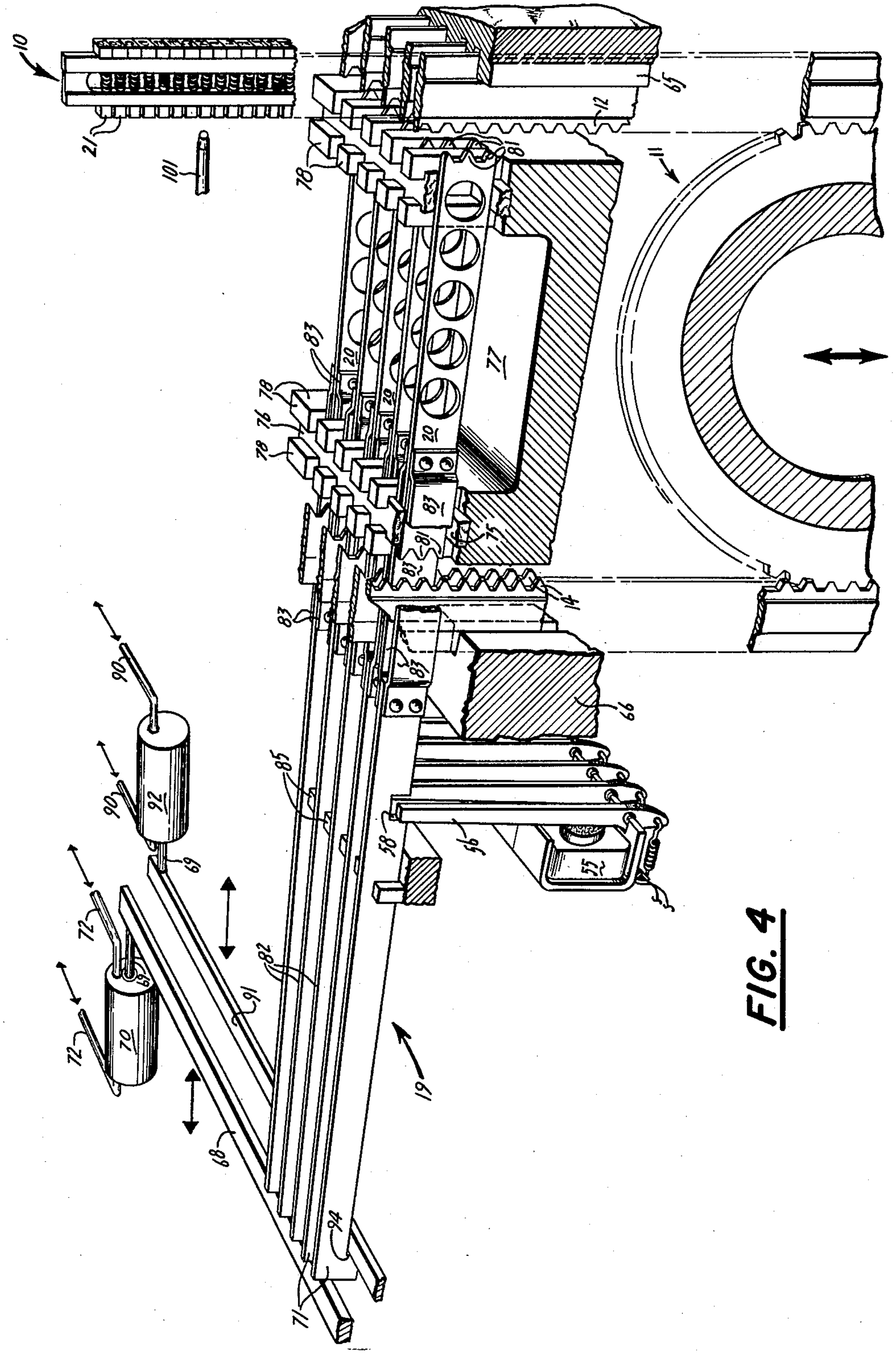
FIG. 4 is a perspective view of means for selecting a type slug to be printed.

Another component of the novel printing system is the selection mechanism shown in detail in FIG. 4 the operation of which was diagrammatically shown in FIGS. 2*a*–2*c*. A bank of magnets 55 is provided to operate associated selection bars 19. Each magnet 55 is provided with an armature 56 which, when energized, is arranged to be pulled away from the vertical axis of motion of tube 11. Each armature 56 engages a notch 58 formed in an associated one of selection bars 19. There are 120 armatures arranged so that one armature is in a position of alignment for each print station. In order to achieve a close lateral spacing of bars 19, magnets 55 may be staggered in several rows, each row being displaced to provide an offset so that lateral distance between armatures 56 is approximately equal.

The magnets 55 are individually connected to separate data storage locations of a computer (not shown). Each location stores a multiple bit code representing a single character. After each rise and during the subsequent dwell following, all storage locations are sampled by closing one of a plurality of circuit breakers 57 (see FIG. 1) which corresponds to the preceding rise. Thus, after each rise each of the magnets will be either energized or not depending upon the presence or absence of a bit in its associated storage location. There are, therefore, as shown in FIG. 1 six circuit breakers 57 controlled by six cams 59 disposed on cam shaft 17.

Referring again to FIG. 4, the racks 12 of type bars 10 are held in vertical alignment by teeth provided in a combed front plate 65. Similarly, racks 14 are held in vertical alignment by teeth in a combed back plate 66, the front and back plates 65 and 66 forming guide tracks for racks 12 and 14. A select-nonselect interposer 20, as was represented in FIGS. 2*a*–2*c* is provided between each rack 12 and 14, and arranged to ride between a lower support member 75 and an upper support member 76. Member 75 is mounted upon a cross bracing member 77 which has standards 78 extending upwardly between interposers 20 to support member 76 and act as vertical guides for bars 19. The ends of each interposer 20 are provided with teeth 81 to engage racks 12 and 14. Each interposer 20 is sufficiently shorter than the spacing between the two racks 12 and 14 so that it may be centered in a position out of engagement with both racks 12 and 14. A bar driver arm 82 is attached to each interposer 20 by two plates 83 which are arranged to pass around the sides of rack 14. Each arm 82 is guided and supported by two support combs 85.

A selection bail 68, connected at each end to the piston rod 69 of a double-acting piston 70, is arranged parallel with the ends 71 of bars 19 for driving all bars 19 simultaneously to the right, as viewed in FIG. 4, into the non-select condition. The cylinder of piston 70 is connected by hydraulic leads 72 to a spring-loaded four-way spool valve 87 in control block 88 represented in FIG. 1. Valve 87 is controlled by a cam 89 mounted on shaft 17. Thus, with valve 87 in one position, bail 68 moves to the right, while reversing valve 87 drives it to the left.

A reset bail 91 is arranged and controlled in a fashion similar to that of selection bail 68. Double-acting pistons 92 are connected to the ends of bail 91 and are controlled from block 88 via leads 90 by another spring-loaded four-way spool valve 93 cooperating with a cam 95 on shaft 17. Bail 91 engages a lip 94 on each bar 19 in order to drive all bars simultaneously leftward. However, since interposers 20 must be centered between racks 12 and 14 at reset time (see FIG. 2*a*) the "throw" of pistons 92 is limited so as not to carry interposers 20 beyond a central position. To provide positive control over bars 19, bail 68 is driven against ends 71 during positioning of interposers 20 to the reset condition shown in FIGS. 2*a* and 4. Pistons 92 are made slightly larger than pistons 70 in order that bail 91 will always be able to overcome bail 68.

*Printing mechanism*

Referring to FIGS. 1 and 5 a print hammer mechanism for a print station is thereshown. Each hammer mechanism comprises a bell-crank print hammer 101, pivoted on a pin 102. Hammer 101 is urged forward by a leaf spring 103 secured to a spring support member 105. Hammer 101 is restrained from moving, however, by a hammer latch 106, the distal end of which is spring biased downwardly engaging the top of hammer 101. Latch 106 is pivoted at its proximal end on pin 108.

All print hammers are cocked and fired by a pivotally mounted hydraulic hammer cocking bail 110 disposed to operate normal to the direction of the striking motion of hammers 101. Bail 110 is connected at one end to a hammer cylinder 111 operated via hydraulic leads 113 connecting block 88 thereto and at its other end by a pivot pin 100. Still another spring-loaded four-way spool valve 96 in block 88, actuated by a cam 97 on shaft 17 controls cylinder 111. Cylinder 111 also employs a double-acting piston. Its piston rod 114, extending from cylinder 111, has a bifurcated end 116 to receive bail 110 therebetween. A pin 117 extends through bail 110 as well as through end 116 to complete the bail coupling. Bail 110 extends along under all latches 106 and over all crank arms 117 of hammers 101. With this relationship, downward movement of rod 114 cocks hammers 101 against the urging of springs 103 thereby latching all hammers 101. Firing hammers 101 is accomplished by actuating valve 96 to drive rod 114 upwardly releasing hammers 101. It is to be noted that shock which would be developed by all hammers striking platen 119 at the same instant is avoided by this arrangement since the firing occurs in a ripple movement starting at the leftmost print station, as viewed in FIG. 1.

*System operation*

Figures 6, 7:
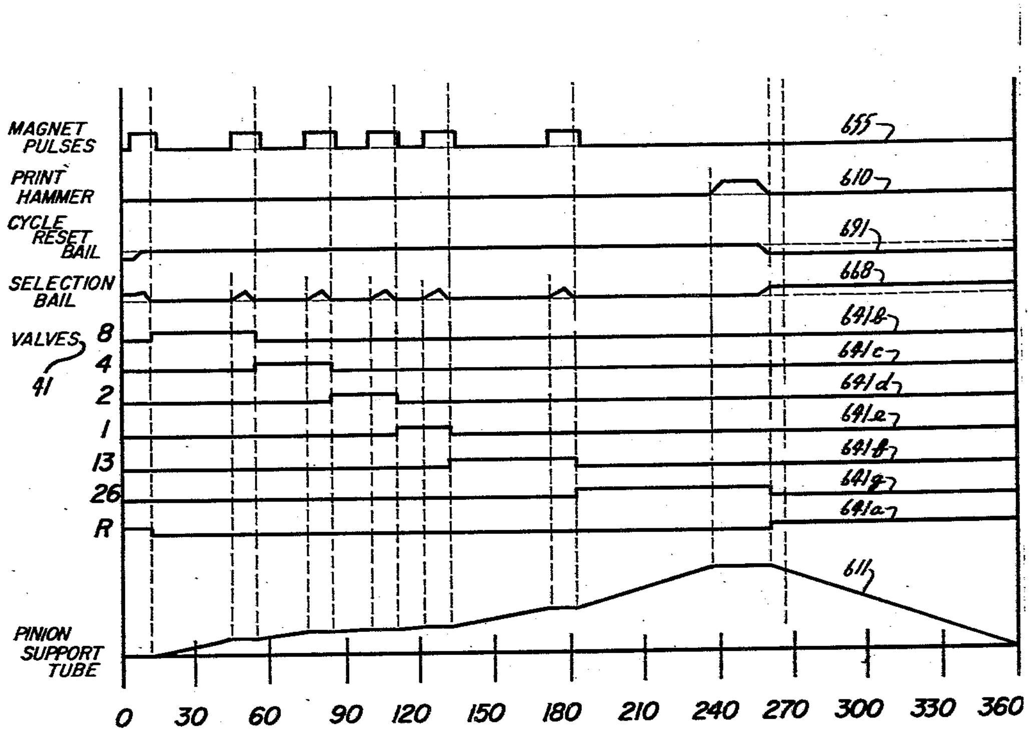
FIG. 6 is a timing chart for the entire printing system.
FIG. 7 shows a code illustrating the combinations of rises required to select one of fifty-two character positions.

Having described the foregoing system components, the operation of a cycle of the overall system may now best be understood by referring to the timing chart of FIG. 6 as well as to the code shown in FIG. 7.

The timed relationships among the several components during a single cycle of operation are illustrated by curves in FIG. 6, wherein curve 611 represents the linear movements of pinion support tube 11, curves 641*a*–641*g* the actuation of valves 41*a*–41*g*, 668 and 691 the movements of bails 68 and 91 respectively, 610 the operation of bail 110, and 655 the energization of magnets 55. Referring to the code in FIG. 7, the upper three rows of numbers taken together represent various combinations of three binary coded inputs which, when used with the Y and/or Z inputs shown in the left-hand column (wherein Y represents a 13 unit rise of a type bar and Z a 26 unit step) will place any one of 48 selected characters in its proper print position. For example, a "G" uses inputs of 4, 2, 1 and Z for a total of 33 units because it is the thirty-third slug down from the top of the type bar used. Similarly, a "V" needs 4, 1, Y and Z for a total of 44 units.

To illustrate by example the operation of the invention, a type bar 10 will be positioned to place the character "H" in printing alignment with an associated hammer 101. Initially, all racks 14 and bars 10 are bottomed against their lower stops. Motor 16 and pump 40 are both operating and clutch 18 is disengaged. Valve 41*a* is open (see curve 641*a*) and pistons 30 are therefore adjacent ports 42*a*. All selection bars 19 are held in their neutral position under the coaction of bails 68 and 91, as shown in curves 668 and 691 at 0°. In this condition a cycle is commenced by engaging clutch 18. This rotates shaft 17 which turns cam 95. As cam 95 commences to move, valve 93 directs fluid from pump 40 via hydraulic lead 41 and block 88 to retract bail 91 to the right (as viewed in FIGS. 1 and 4). This movement of bail 91 removes its counteracting force from against bail 68, allowing bail 68 to project all selection bars 19 into their non-select positions as in FIG. 2*b*. This occurs at approximately 9° as shown on curve 668 of the chart of FIG. 6. Just prior to this, at about 2° (on curve 655), magnet 55 (for the print station of the example) has been energized by a pulse liberated from storage by the closing of the first of circuit breakers 57 (FIG. 1), thereby moving bar 19 to its select condition the movement bail 68 is withdrawn. By 13° bar 19 has been "selected."

Valve 41*a*, which has been open, is closed at 14° (see 641*a*) and valve 41*b* opened. Both pistons 30 are thereby caused to rise to the opened ports 42*b* carrying tube 11 and type bar 10 of the example upwardly eight units. This rise is completed at about 44° (on curve 611). During the dwell which follows, bail 68 commences (see curve 668) the placing of all selection bars 19 into the non-select condition. Since the code shown for an "H" in FIG. 7 employs an 8 unit rise and a Z (or 26 unit) rise of the type bar, no pulse will be directed to the magnet in the example during the dwell preceding the next rise although one is shown on curve 655, since the subject curve shows all possible times for pulsing magnets 55. Therefore, the type bar in the example remains locked by its associated selection bar 19.

At about 55° valve 41*b* is closed and 41*c* is opened. Tube 11 rises upwardly four units carrying rack 14 of the example with it. Bail 68 then again drives all bars 19 (at about 75°) into the non-select condition. No pulse is received by magnet 55, and after a 10° dwell, valve 41*c* closes and 41*d* opens imparting a two unit rise to tube 11. However, no upward movement is imparted to type bar 10 since it continues to be held by its selection bar 19. Thus, in the example, at the end of about 101° the type bar has been positioned upwardly only eight units.

Tube 11 now dwells for 10° during which time bail 68 goes to non-select. Magnet 55 again is not pulsed. Valve 41*d* closes and 41*e* opens producing a one unit rise by tube 11 which is followed, as before, by actuation of bail 68. The subsequent thirteen unit step designated in FIG. 7 as the Y rise occurs in similar fashion while magnet 55 remains deenergized. At the end of the Y rise bail 68 again drives all selection bars 19 into a non-select condition. The "H" slug 21 will now be aligned during the following Z step to printing position opposite its hammer 101. This is effected by pulsing magnet 55 during the actuation of bail 68 so that when bail 68 is released magnet 55 will place selection bar 19 in engagement with rack 14 thereby permitting type bar 10 to move upwardly 26 units during the Z step.

By approximately 237° tube 11 has reached its uppermost position and all type bars are now ready for printing. Hammers 101 are fired at this time and re-cocked by the end of twenty-three additional degrees, during which time bails 68 and 91 are being actuated to place all interposers 20 in their neutral or reset positions. With interposers 20 centralized between racks 12 and 14, valve 41*g* is closed and valve 41*a* is opened returning tube 11 downwardly to its lowermost point of travel. Thus, the cycle of operation for a single print station has been completed. It is to be noted that clutch 18 can be disengaged at approximately 266° without interfering with the fall of tube 11. Therefore, it is during this nearly one-quarter cycle that preparations for subsequent cycles, such as the format changes mentioned earlier, can be made without interfering with the downward travel of tube 11 and type bars 10.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a printing system including a plurality of type bars selectively positioned by a setup mechanism common to said type bars, said setup mechanism being arranged to travel through a cycle of predetermined discrete displacements, actuating means for driving said setup mechanism comprising in combination a closed cylinder, a plurality of pistons movably disposed therein and loosely coupled together so that each piston is movable relative to the adjoining piston a given different number of units and so that the sum total of the positive piston movements represents the extent to which said mechanism is moved, means for connecting a terminal one of said pistons to said type bar setup mechanism so as to positively position said mechanism in a predetermined sequence corresponding to said given different number of units, a first and second source of fluid pressure, the pressure of said second source being lower than that of said first source, a distributor arranged to successively admit fluid from said first source into said cylinder via a port between each of said pistons to actuate said setup mechanism step by step through said cycle, drive means for continuously operating said distributor to move said setup mechanism through its cycle of displacements, said distributor being further arranged to disconnect said ports from said first pressure source and to connect said ports to said second pressure source during each cycle of operation, biasing means for returning said mechanism to its original position while said ports are connected to said second pressure source, and a clutch interposed between said drive means and said distributor to provide cyclic positioning of said setup mechanism under control of said clutch.

2. In a parallel type bar printer having a plurality of type bars, setup means connected in common to the plurality of type bars and arranged to travel through a predetermined sequence of discrete displacements, controllable means operatively associated with said setup means for selectively positioning individual type bars in a printing position, a mechanism for driving said setup means through said predetermined sequence of discrete displacements comprising, a fluid actuator drivingly coupled to said set up means and movable through said predetermined sequence of discrete displacements, valve means controlling the application of fluid pressure to said actuator for determining the several discrete displacements of said actuator movement, a valve actuator for said valve means, means including a quick operable coupling selectively connected to said valve actuator and operable to actuate said valve actuator when connected thereto, thus causing the valve means to control the application of fluid pressure to said fluid actuator and cause said fluid actuator to move said setup means through said predetermined sequence, hence enabling selective positioning of individual type bars at the printing position so that said predetermined sequence may be commenced at selected times.

3. A printer as defined in claim 2 wherein said valve means includes a plurality of valves, each of said valves being arranged to determine one of the several displacements of the fluid actuator.

4. A printer as defined in claim 3 wherein the valve actuator includes, a plurality of cams, one cam for each of said valves, a cam shaft supporting said plurality of cams, said cams being arranged to operate said valves in a sequence, thus providing movement of said fluid actuator and setup means according to said predetermined sequence of displacements.

5. A printer as defined in claim 2 wherein the fluid actuator comprises, a closed cylinder, a piston within said cylinder, said piston being disposed to travel lengthwise of said cylinder, means for supplying a fluid under substantially the same pressure to opposite sides of said piston, means defining a plurality of ports in said cylinder, said ports being disposed in spaced apart relation along the length of said cylinder at predetermined distances and arranged to determine the positioning of said piston at a position adjacent any one of said ports by exhausting fluid therefrom.

6. A printer as defined in claim 2 wherein the means including a quick operable coupling comprises, a continuously operable drive motor and a quick engaging clutch, the drive motor connected to drive said valve actuator through said clutch.

References Cited in the file of this patent

UNITED STATES PATENTS

| | | |
|---|---|---|
| 1,726,539 | Carroll | Sept. 3, 1929 |
| 2,027,916 | Lasker | Jan. 14, 1936 |
| 2,183,401 | Judelshon | Dec. 12, 1939 |
| 2,197,867 | Klement | Apr. 23, 1940 |
| 2,824,513 | Johnson et al. | Feb. 25, 1958 |